(12) United States Patent
Mitra et al.

(10) Patent No.: US 12,223,248 B1
(45) Date of Patent: Feb. 11, 2025

(54) SYSTEM, METHOD, AND COMPUTER PROGRAM PRODUCT FOR OPTIMIZATION-BASED PRINTED CIRCUIT BOARD DESIGN

(71) Applicant: Cadence Design Systems, Inc., San Jose, CA (US)

(72) Inventors: Joydeep Mitra, Austin, TX (US); John Robert Murphy, Boston, MA (US); Zachary Joseph Zumbo, Brookline, MA (US); Luke Roberto, Brookline, MA (US); Taylor Elsom Hogan, Boston, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 565 days.

(21) Appl. No.: 16/989,058

(22) Filed: Aug. 10, 2020

(51) Int. Cl.
| | |
|---|---|
| G06N 3/088 | (2023.01) |
| G06F 30/31 | (2020.01) |
| G06F 30/392 | (2020.01) |
| G06F 30/394 | (2020.01) |
| G06N 3/045 | (2023.01) |
| G06N 3/08 | (2023.01) |
| G06N 3/082 | (2023.01) |
| G06N 3/084 | (2023.01) |
| G06N 3/126 | (2023.01) |
| G06N 20/20 | (2019.01) |
| G06F 111/06 | (2020.01) |
| G06F 115/12 | (2020.01) |

(52) U.S. Cl.
CPC ............ *G06F 30/392* (2020.01); *G06F 30/31* (2020.01); *G06F 30/394* (2020.01); *G06N 3/045* (2023.01); *G06N 3/08* (2013.01); *G06N 3/126* (2013.01); *G06F 2111/06* (2020.01); *G06F 2115/12* (2020.01)

(58) Field of Classification Search
CPC ...... G06F 30/392; G06F 30/31; G06F 30/394; G06F 2111/06; G06F 2115/12; G06N 3/045; G06N 3/08; G06N 3/126
See application file for complete search history.

(56) References Cited

U.S. PATENT DOCUMENTS

| | | | |
|---|---|---|---|
| 10,417,556 B1 * | 9/2019 | Fairbank | G06N 3/08 |
| 11,250,061 B1 * | 2/2022 | Nama | G06N 3/084 |

(Continued)

*Primary Examiner* — Brandon S Cole
(74) *Attorney, Agent, or Firm* — Mark H. Whittenberger; Holland & Knight LLP

(57) ABSTRACT

The present disclosure relates to electronic circuit design, and more specifically, to training a neural network to serve as the reward function for optimization-based approaches to PCB design automation. Embodiments may include generating, using a processor, one or more placed designs using a genetic optimization methodology including a reward function and adjusting the one or more placed designs and the reward function during the generating. Embodiments may further include routing the one or more placed designs using an auto-router to assign a routability score label and training a neural network, using the one or more placed designs and the routability score label, to extract one or more intermediate features from the one or more placed designs. Embodiments may also include predicting a routability of the PCB design based upon, at least in part, the one or more intermediate features.

12 Claims, 11 Drawing Sheets

(56) References Cited

U.S. PATENT DOCUMENTS

| | | | |
|---|---|---|---|
| 2018/0253512 A1* | 9/2018 | Green | G06N 3/088 |
| 2019/0244129 A1* | 8/2019 | Tabuchi | G06F 9/5033 |
| 2020/0167631 A1* | 5/2020 | Rezgui | B25J 9/0084 |
| 2022/0012917 A1* | 1/2022 | Kelly | G01N 21/956 |

* cited by examiner

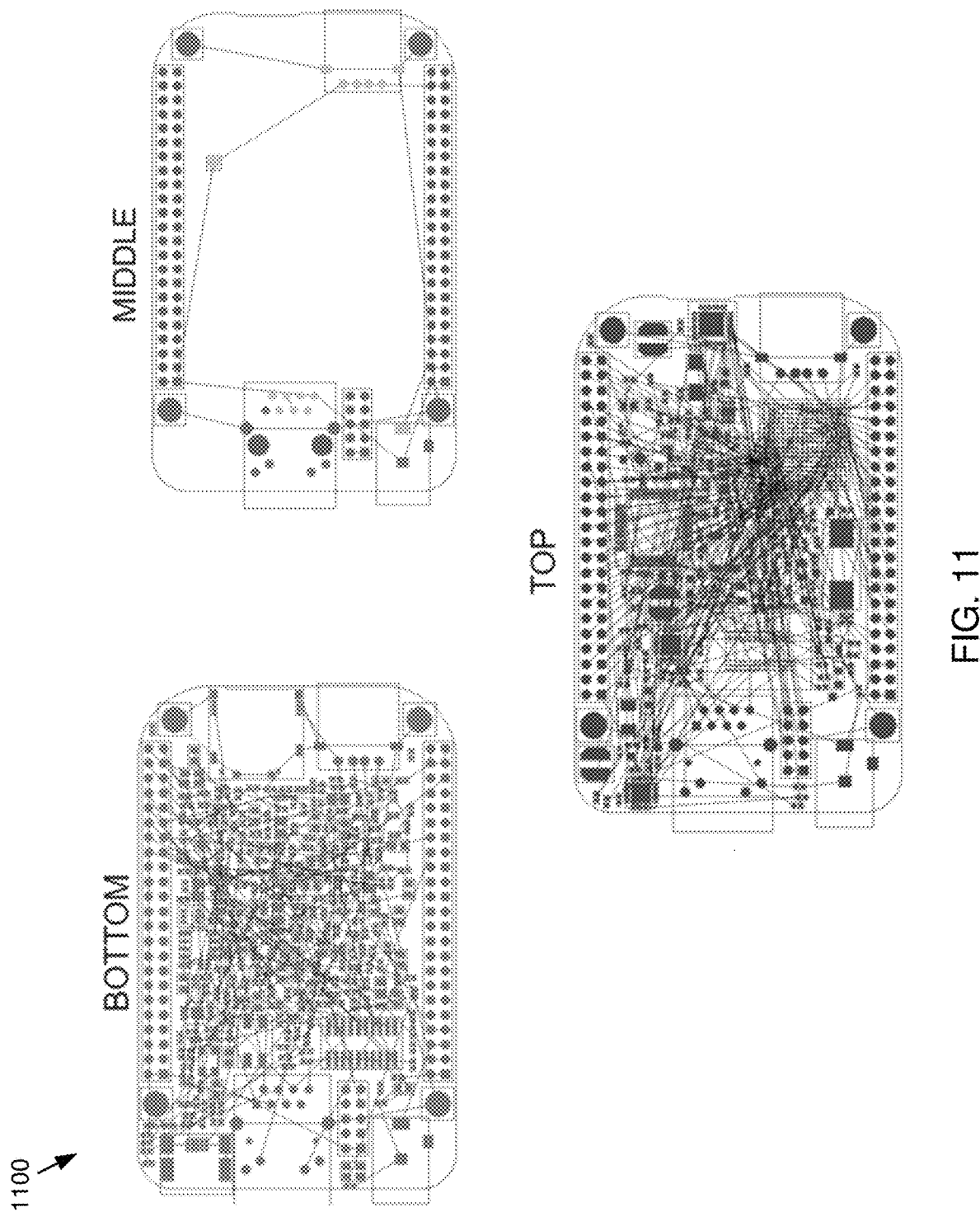

SYSTEM, METHOD, AND COMPUTER PROGRAM PRODUCT FOR OPTIMIZATION-BASED PRINTED CIRCUIT BOARD DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design, and more specifically, to training a neural network to serve as the reward function for optimization-based approaches to PCB design automation.

DISCUSSION OF THE RELATED ART

Despite over 35 years of development effort from industry and the academic sector, the design of printed circuit boards ("PCBs") and packages remain a very manual and human effort. The reasons span from behavioral to technical, but it is clear that the lack of automation in electronic design automation ("EDA") is limiting quality and time to market. People heuristically break the problem of PCB design into component placement, via assignment, and routing. Each of these problems have human and algorithmic strategies associated with them. The human strategies are learned through years of trial and error, and through shared knowledge with other designers. The development of sophisticated simulation software has virtualized the process for PCB designers, but it is still highly manual.

PCB design can also be divided into a placement stage and a routing stage. The primary objective of the placement stage is to place components in a way that leads to a high completion rate in the routing stage. Completion rate is the percentage of successfully routed connections. Completion rate may also be referred to as "routability." A PCB placement, from the placement stage, must also satisfy various design rule checks ("DRC"), including but not limited to component spacing, signal integrity, and thermal constraints. For some designs, a PCB designer may also wish to optimize for other variables that might influence the cost, for example the board size, number of layers, or manufacturing-specific pricing.

Existing placement algorithms can be divided into two main categories: constructive placement and iterative improvement. Before defining and covering popular examples of algorithms in each category, it is important to note that there is very little publicly available research on PCB design automation. On the other hand, chip placement automation has a rich history and is frequently public. Although PCB and chip placement automation have significant differences, some research in chip design automation may be applied to the PCB domain and, as such, much of the research cited comes from research in the chip domain.

Constructive placement algorithms generate a placement from scratch, and this category includes the many variations of quadratic solvers developed for chip placement. Another category of constructive placement algorithms are Reinforcement Learning ("RL") based, which includes the approach described in Google AI's recent paper titled "Chip Placement with Deep Reinforcement Learning." The "agent" has a list of devices and a canvas to place on, constructively building up a solution that is then given a reward. The "rollout policy" is then refined until good placements are found.

Iterative improvement algorithms start with an initial placement and then make a series of modifications, using a cost function to score and filter the set of placements. Popular placement algorithms for chip placement include simulated annealing ("SA"), which randomly perturbs an initial placement, scores this placement, and always accepts it if the cost decreases and accepts one with an increased cost with a configurable probability. Other iterative placement algorithms use genetic optimization ("GO"), which begin with an initial set, or "population," of placements. The placements are each assigned a "fitness," and then "mutation" and "crossover" operations are applied to these placements. These operations involve applying random perturbations and combinations, respectively, where placements with higher fitnesses are involved in a greater number of these combinations and thus their features are propagated throughout the population. A small subset of placements are unmodified at each generation, and over time the fitnesses of placements in the population increase. In RL-based iterative placement algorithms, one defines a set of actions that can be applied to a current placement solution. At each iteration, an "agent" applies an action to the current placement that maximizes the "reward" of the resulting placement. Over time the agent learns to apply action sequences that attain placements with higher reward.

Iterative improvement placement algorithms like SA, GO, and RL all rely on an evaluation function to assess a placement, and from here on we will adopt the GO terminology and refer to the evaluation function as a "fitness function." The fitness function guides the iterative process towards an optimal placement. As previously mentioned, the primary goal of the placement stage is to generate a placement with high routability that leads to a successful routing stage. Therefore, the ideal fitness function would be to route each placement and output the routability. However, iterative improvement algorithms typically require a large number of iterations to reach a near-optimal solution, and thus this fitness function must not only be accurate but also quick to compute. Routing each placement would be far too slow, so the fitness function must instead use a heuristic that is ideally highly correlated with routability. Over the years researchers have developed many different proxies for placement routability that can serve as the basis of the fitness function. Some of the most commonly used routability heuristics are described below, and each has its drawbacks that does not meet the needs of PCB design automation.

SUMMARY

In one or more embodiments of the present disclosure a computer-implemented method associated with a printed circuit board ("PCB") design is provided. The method may include generating, using a processor, one or more placed designs using a genetic optimization methodology including a reward function and adjusting the one or more placed designs and the reward function during the generating. The method may further include routing the one or more placed designs using an auto-router to assign a routability score label and training a neural network, using the one or more placed designs and the routability score label, to extract one or more intermediate features from the one or more placed designs. The method may also include predicting a routability of the PCB design based upon, at least in part, the one or more intermediate features.

One or more of the following features may be included. The reward function may be a wire-crossings based reward function. The one or more placed designs may include image data, graph data, and/or scalar data. The neural network may be one or more of a convolutional neural network ("CNN") architecture, a graph convolutional network ("GCN") architecture, and/or a deep neural network ("DNN") architecture. The one or more placed designs may include image data, graph data, and scalar data and wherein the image data is used to train a CNN, the graph data is used to train a GCN, and the scalar data is used to train the DNN.

In yet another embodiment of the present disclosure a non-transitory computer-readable storage medium having stored thereon instructions, which when executed by a processor result in one or more operations is provided. Operations may include generating, using a processor, one or more placed designs using a genetic optimization methodology including a reward function and adjusting the one or more placed designs and the reward function during the generating. Operations may further include routing the one or more placed designs using an auto-router to assign a routability score label and training a neural network, using the one or more placed designs and the routability score label, to extract one or more intermediate features from the one or more placed designs. Operations may also include predicting a routability of the PCB design based upon, at least in part, the one or more intermediate features.

One or more of the following features may be included. The reward function may be a wire-crossings based reward function. The one or more placed designs may include image data, graph data, and/or scalar data. The neural network may be one or more of a convolutional neural network ("CNN") architecture, a graph convolutional network ("GCN") architecture, and/or a deep neural network ("DNN") architecture. The one or more placed designs may include image data, graph data, and scalar data and wherein the image data is used to train a CNN, the graph data is used to train a GCN, and the scalar data is used to train the DNN.

In one or more embodiments of the present disclosure a system associated with a printed circuit board ("PCB") design is provided. The system may include a processor configured to generate one or more placed designs using a genetic optimization methodology including a reward function and to adjust the one or more placed designs and the reward function during the generating. The processor may be further configured to route the one or more placed designs using an auto-router to assign a routability score label. The processor may be further configured to train a neural network, using the one or more placed designs and the routability score label, to extract one or more intermediate features from the one or more placed designs. The processor may be further configured to predict a routability of the PCB design based upon, at least in part, the one or more intermediate features.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 11 is an example 3-channel image-based representation for a placed design is provided in accordance with an embodiment of the present disclosure.

DETAILED DESCRIPTION

Figure 1:
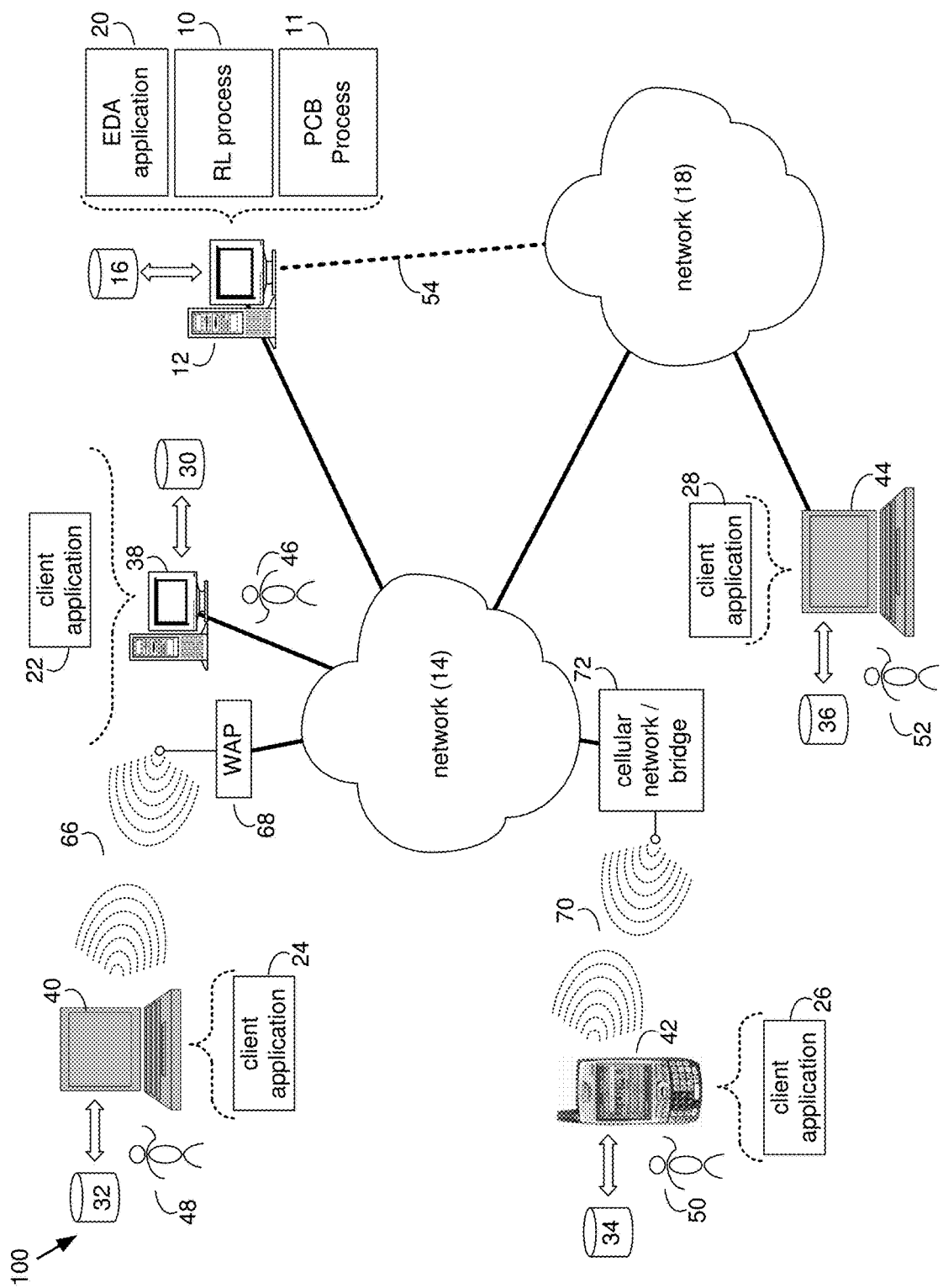
FIG. 1 is a diagram depicting an embodiment of a system in accordance with the present disclosure.

Embodiments of the present disclosure are directed towards systems and methods for reframing the PCB floorplanning process into an iterative design process under a machine learning framework. In some embodiments, a hierarchical reinforcement learning (RL) agent may take the current state of a design and recommend abstract "actions" to take in order to iteratively move the design towards closure, whether that be routability or some other metric. This provides a robust and flexible system to allow system designers to specify different design considerations to our tool.

Embodiments of the present disclosure are also directed towards a methodology that uses a neural network to serve as a reward function for optimization-based approaches to PCB design automation. The system may utilize a neural network that inputs a representation of a placed PCB and outputs a routability score. In some embodiments, the neural network may be a deep neural network. Instead of using the traditional heuristic methods, the routability score from the trained neural network may be more accurate and may closer match the true reward. In other words, instead of relying on a specific heuristic to serve as the reward function for a placed board, a neural network is provided that can learn which design features to consider when assigning reward. The outputs of this neural network will correlate more strongly with the true routability of a placed design than previously used heuristics.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, SystemC, SystemVerilog and Verilog-AMS. Various other hardware description languages may also be used as well.

Referring to FIG. 1, there is shown a reinforcement learning process 10 that may reside on and may be executed by server computer 12, which may be connected to network 14 (e.g., the Internet or a local area network). There is also shown PCB process 11 that may reside on and may be executed by server computer 12, which may be connected to network 14 (e.g., the Internet or a local area network).

Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, reinforcement learning process 10 may reside on and be executed, in whole or in part, by a client electronic device, such as a personal computer, notebook computer, personal digital assistant, or the like. Additionally/alternatively, PCB process 11 may reside on and be executed, in whole or in part, by a client electronic device, such as a personal computer, notebook computer, personal digital assistant, or the like.

The instruction sets and subroutines of reinforcement learning process 10 and/or PCB process 11, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Reinforcement learning process 10 may be a standalone application, or may be an applet/application/script that may interact with and/or be executed within EDA application 20. In addition/as an alternative to being a server-side process, reinforcement learning process 10 may be a client-side process (not shown) that may reside on a client electronic device (described below) and may interact with an EDA client application (e.g., one or more of EDA client applications 22, 24, 26, 28). Further, reinforcement learning process 10 may be a hybrid server-side/client-side process that may interact with EDA application 20 and an EDA client application (e.g., one or more of client applications 22, 24, 26, 28). As such, reinforcement learning process 10 may reside, in whole, or in part, on server computer 12 and/or one or more client electronic devices.

PCB process 11 may be a standalone application, or may be an applet/application/script that may interact with and/or be executed within EDA application 20. In addition/as an alternative to being a server-side process, PCB process 11 may be a client-side process (not shown) that may reside on a client electronic device (described below) and may interact with an EDA client application (e.g., one or more of EDA client applications 22, 24, 26, 28). Further, PCB process 11 may be a hybrid server-side/client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize reinforcement learning process 10 and/or utilize PCB process 11.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to PCB process 11 and/or reinforcement learning process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
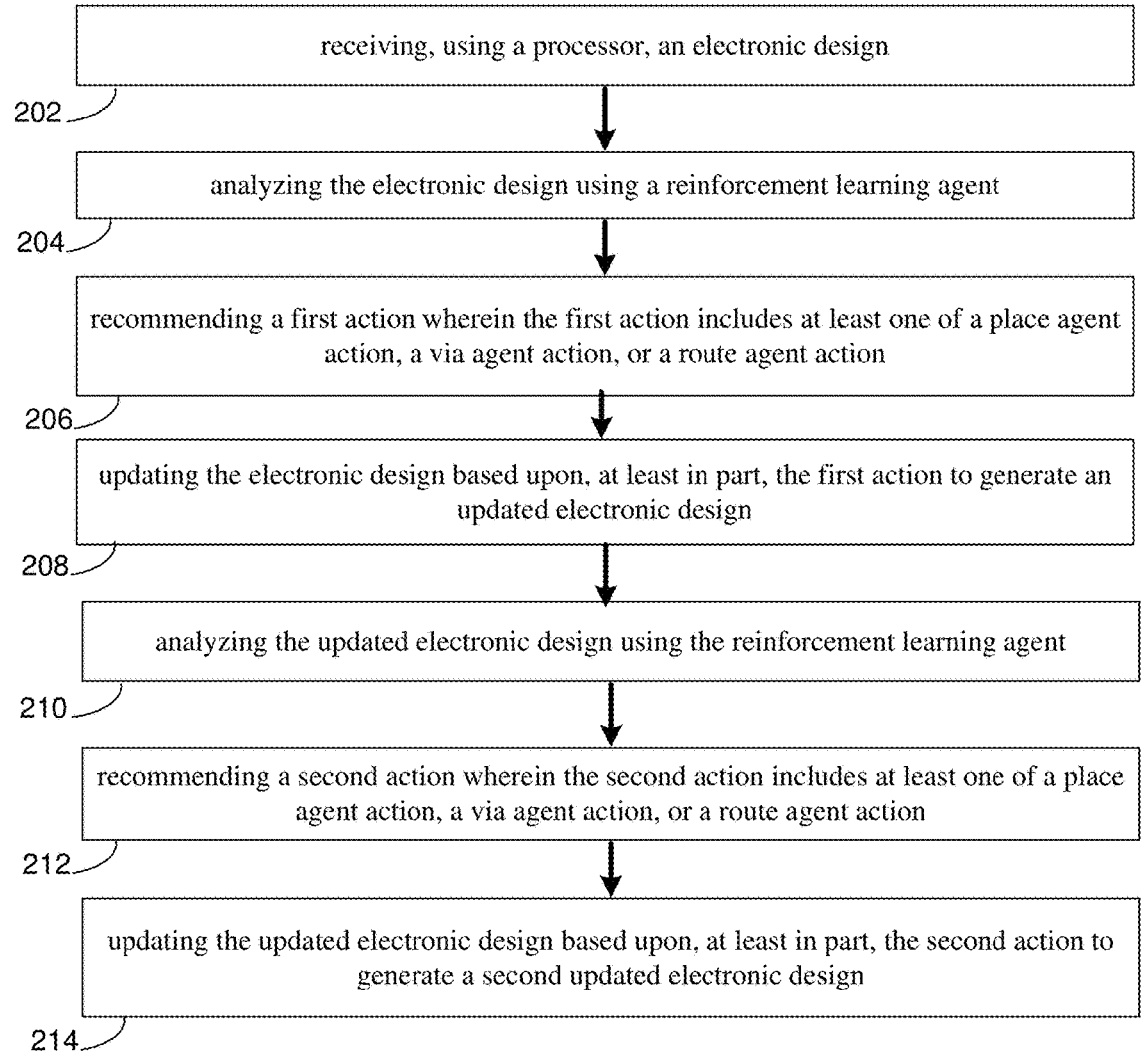
FIG. 2 is a flowchart depicting operations consistent with the reinforcement learning process in accordance with an embodiment of the present disclosure.

Referring now to FIG. 2, an exemplary flowchart 200 depicting operations for use in accordance with reinforcement learning process 10 is provided. Embodiments may include receiving (202) an electronic design and analyzing (204) the electronic design using a reinforcement learning agent. The method may further include recommending (206) a first action wherein the first action includes at least one of a place agent action, a via agent action, or a route agent action. The method may also include updating (208) the electronic design based upon, at least in part, the first action to generate an updated electronic design. The method may further include analyzing (210) the updated electronic design using the reinforcement learning agent and recommending (212) a second action wherein the second action includes at least one of a place agent action, a via agent action, or a route agent action. The method may also include updating (214) the updated electronic design based upon the second action to generate a second updated electronic design.

The term "placement", as used herein, may refer to the process of placing discrete components on the surfaces (e.g., top, bottom or embedded) of a PCB such that certain physical design metrics are optimized. Such metrics may include, but are not limited to, wire length, component density (e.g., spread) and congestion of signal wires. All existing optimization metrics used in traditional placement algorithms today are but approximations and abstractions of the ideal metric of routability. These systems are optimizing for proxies of this true metric and thus solutions returned by these have no guarantees of returning boards that are actually routable. If a system were to directly optimize routability, routing closure would be directly optimized in the system. As used herein, the term "routability" may refer to the fraction of total connections that may be legally routed satisfying all design rule checks/constraints ("DRCs"). Unfortunately, it is intractable to use routability as a metric since this would involve running a computationally expensive router at every step in the placement process.

Accordingly, embodiments of the present disclosure may utilize machine learning techniques as a powerful function approximator. In some embodiments, RL process 10 may be configured to train a machine learning model offline in a distributed fashion on a continually growing corpus of boards and their routed counterparts. The feature vector for the model may include a combination of images (e.g., both detailed and abstract design representations) and scalars (e.g., board dimensions, wire length, number of nets, number of packages vs discrete components, etc.). The scalars may serve to normalize the design space across a large cross section of PCBs. This trained machine learning model may now be used to infer routability during the inner steps of the placement algorithm thus accelerating true routing closure.

Figure 3:
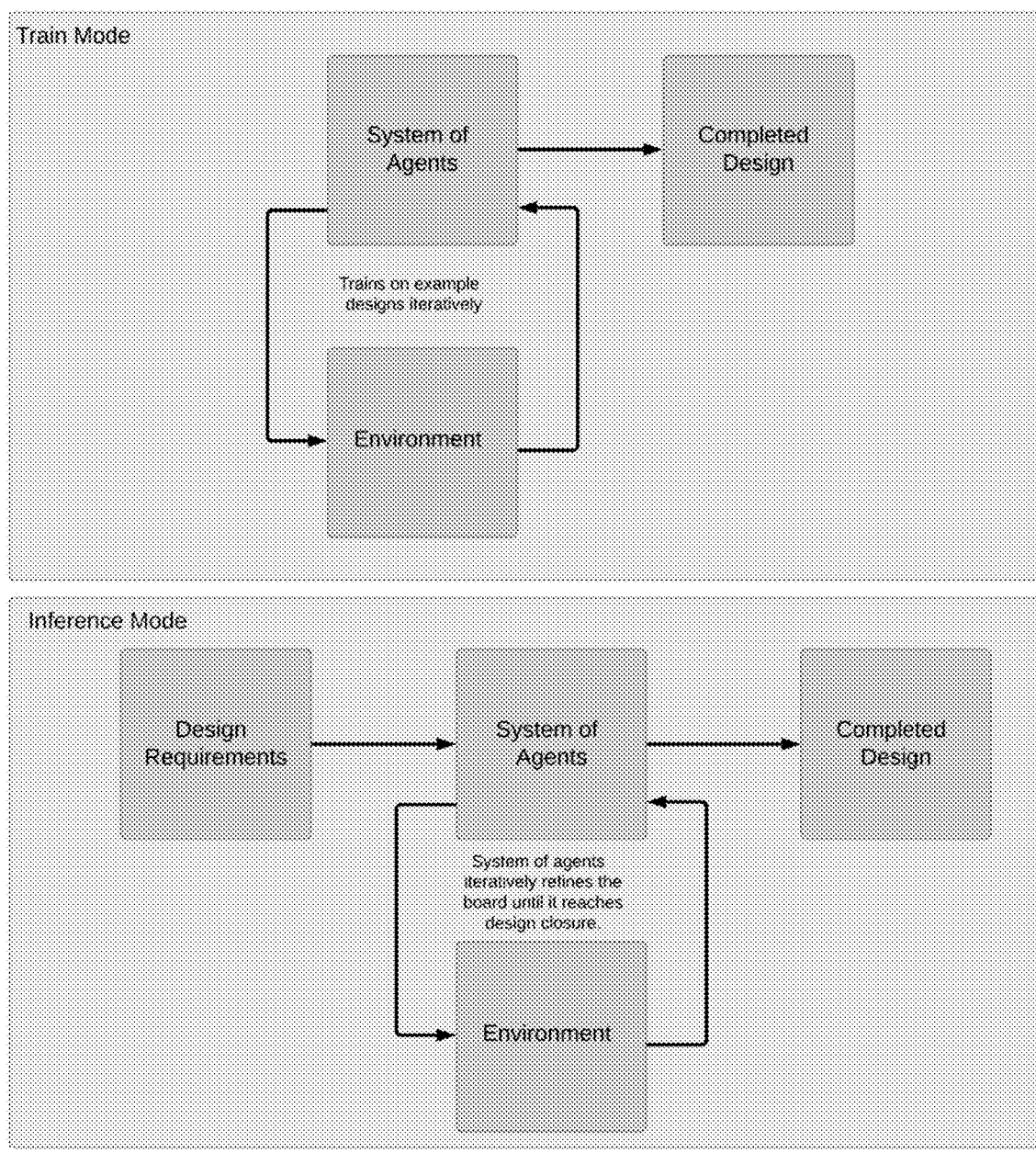
FIG. 3 is a flowchart depicting one example flow of information throughout the system in accordance with an embodiment of the present disclosure.

Referring now to FIG. 3, an exemplary flowchart depicting the flow of information throughout the system is provided. The reinforcement learning agent observes the state of the design (combination of images, scalars, and graphs) and then chooses a corresponding action to perform on the board. This runs iteratively until the board reaches design closure. A distinction should be made between training and inference modes. In some embodiments, the training mode may entail training on a repository of designs. The inference mode may then run the agent on designs it has not seen before, running iteratively until the board reaches design closure.

In some embodiments, RL process 10 may apply one or more via strategies according to the teachings of the present disclosure. The application of via strategies may include the process of assigning layers to the various connections in a PCB. This may include, but is not limited to, including layer transitions within single connections to enable routing closure. This layer assignment step may again be formulated as an optimization problem with the ideal cost function being maximization of routability. This problem differs from the placement problem above with the introduction of a variable number of layers along with layer width and clearance constraints which complicates the above approach of training an machine learning model.

Embodiments of the present disclosure may be configured to train a machine learning model with similar images as above but using a single layer feature vector for each training sample. The training sample would thus include images pertaining to all vias and connections for a single assigned layer along with all the above scalars with the addition of layer-based constraints (width and clearance) for this single layer as well. The training label would again be a global router generated routability metric for this layer. This trained model may now be used to infer the routability for a single layer given the corresponding feature vector. The cost would then be a function of all the inferred routability metrics for the current layer assignment across all layers.

Problems in reinforcement learning may be posed as Markov Decision Processes (MDPs), defined by a tuple: (S. A. R. T). The set S refers to the set of states, the set A refers to set of actions that the agent can take in its environment, the function R is the reward function that takes a state and an action pair to return a scalar value, and the function T is the transition model of the environment that takes a state and an action pair to return a new state of the environment. The goal of the reinforcement learning agent is to develop a policy, which is a function that takes in the current state and returns either an action or a distribution over actions. The policy the RL agent develops is one which maximizes the expected discounted cumulative rewards over a sequence of states.

In some embodiments, machine learning may include, but is not limited to, supervised learning, reinforcement learning, and unsupervised learning. They may be defined by their varying levels of supervision in the learning problem, so on one end of the spectrum supervised learning may be concerned with giving an agent a set of data and labels and learning a mapping between them, while unsupervised learning may receive a set of data and learn the structure of that data. Reinforcement learning is in the center of the spectrum as the agent may not be given exact labels for the data, but some sort of light supervision may be given in the form of the reward.

Figure 4:
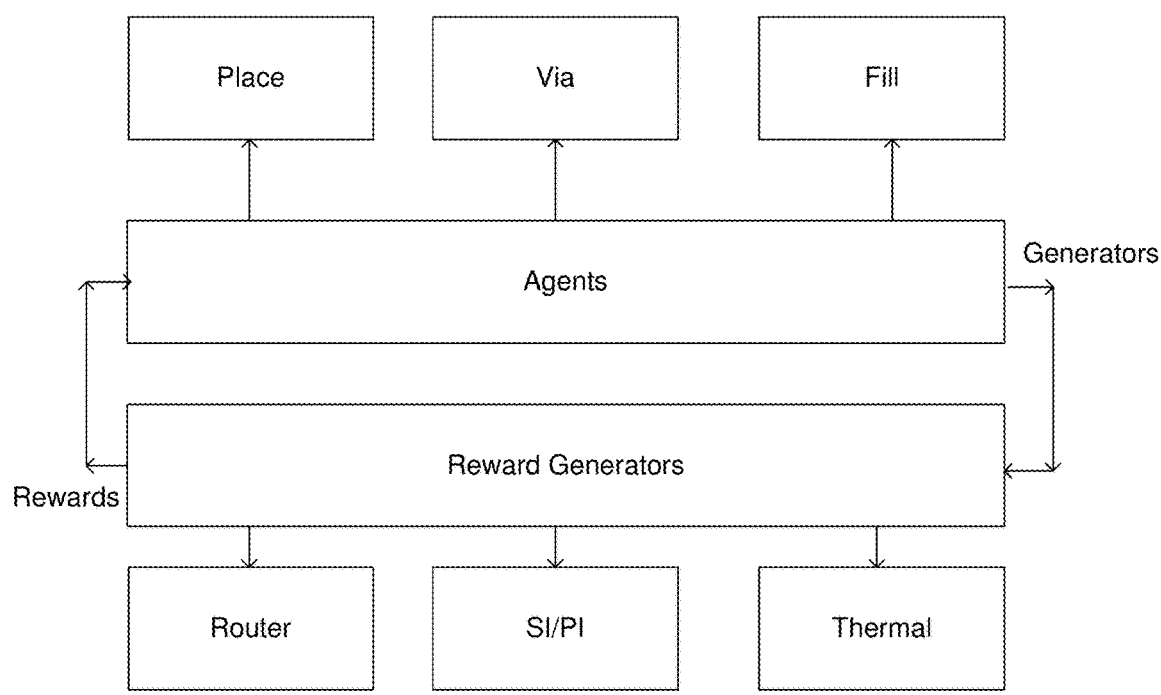
FIG. 4 is a flowchart depicting another example flow of information throughout the system in accordance with an embodiment of the present disclosure.

Referring now to FIG. 4, a flowchart depicting an alternative flow of information throughout the system is provided. This alternative flow chart reframes the learning loop as a flexible system of agents and reward generators. The agents interact with the design through its actions. These actions are then graded by the reward generators under the evaluation of different important metrics like Routability, SI/PI, and Thermal.

Reinforcement learning may be distinct from the other two types of learning because the problem may be framed as the agent collecting its own data. The mapping may be learned incrementally from all the data it collects over time. Embodiments included herein may utilize reinforcement learning problem since the design space of PCB design may be exponentially large in the number of components, board size, and connectivity of the netlist-much too large to collect data in a supervised setting and much too complex to discover structured learning through unsupervised learning. Reinforcement learning may be viewed as a search algorithm that can learn progressively better heuristics under a given reward function over time.

The generic description of the reinforcement learning problem is a bit too general and not quite suited for our problem domain. As noted above, the design space is exponentially large in several factors, and the possible actions that a design agent can take in this environment is also prohibitively large. Any existing reinforcement learning approaches will not provide good performance as it is almost impossible for the agent to learn effectively under these conditions. Accordingly, embodiments of reinforcement learning process 10 may utilize major optimizations to improve a learning agent in this domain. Some of these may include, but are not limited to, hierarchical reinforcement learning, imitation learning, and learning with options.

Figure 5:
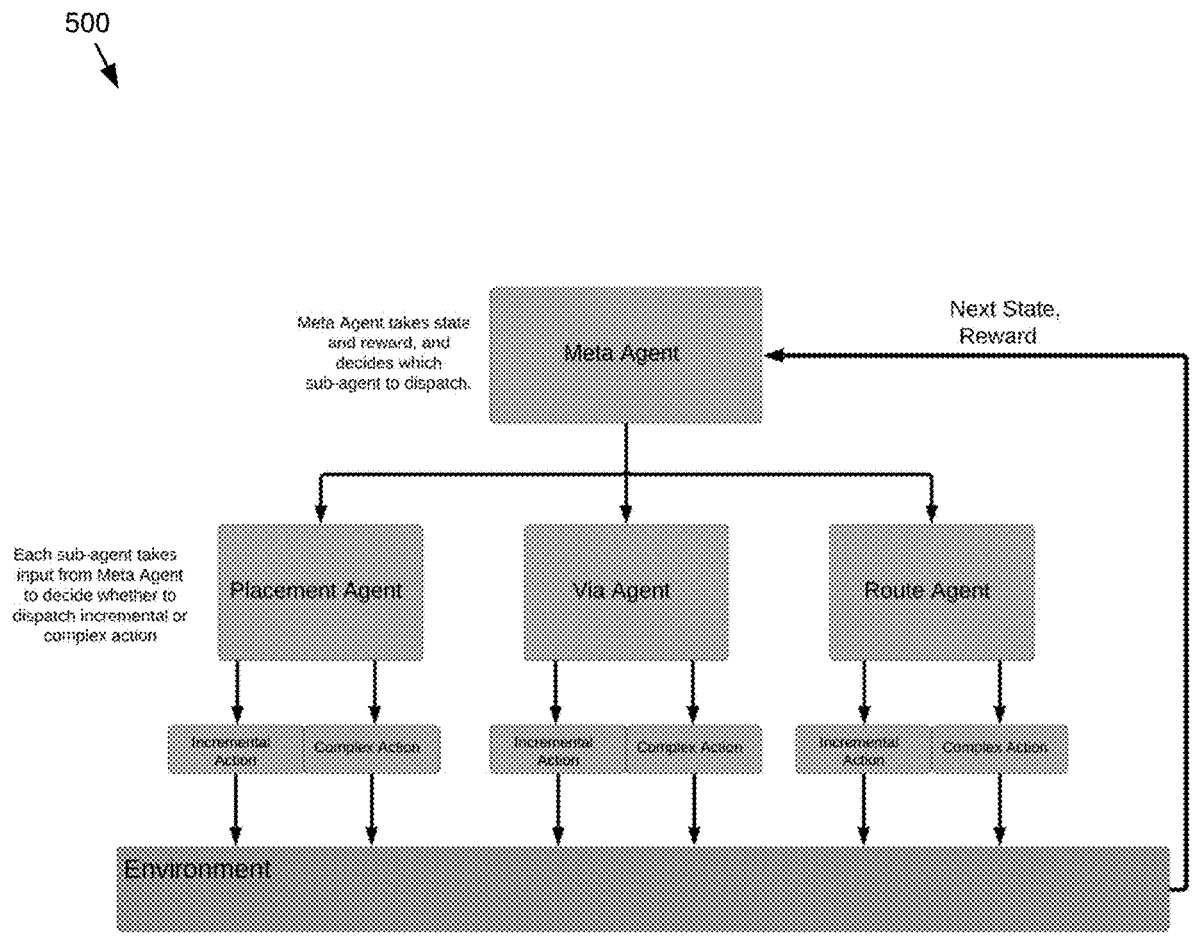
FIG. 5 is a diagram depicting a system of meta-agents in accordance with an embodiment of the present disclosure.

Referring now to FIG. 5, a diagram depicting a system of meta-agents is provided. The figure depicts the system of agents described above. The meta agent takes the current state of the design and decides which agent should be dispatched to improve the board design. For example, if placement is influencing some issues in routing, the agent might dispatch the Place agent to move a component to some better-suited location. FIG. 5 shows that the meta agent takes the state of the design with the reward, and decides which agent to dispatch. The sub agents may also decide whether or not to dispatch an incremental or complex action.

Hierarchical Reinforcement Learning (HRL) is an alternative approach to the MDP problem that constructs a hierarchy of policies, or agents, in order to decompose complex problems into ensembles of simpler ones. Embodiments included herein may utilize concepts associated with meta-learning shared hierarchies and the hierarchical actor-critic. Using a hybrid of these frameworks, embodiments included herein may be configured to decompose the policy into a hierarchy of simpler polices that will operate on a specific task. These approaches also extend the MDP definition to include agent "goals", so a policy may be conditioned on a goal. This allows agents in a hierarchy to modulate their policies to achieve goals given to them by agents above them. For example, RL process 10 may be configured to have an agent trained to take a placed board and a goal to choose an action that refines the current placement to achieve a goal, like incremental improvement in routability. Once RL process 10 has trained separate agents on each task, it may then use a meta-agent to learn how to efficiently dispatch goals to each of the lower level agents. This helps solve the larger scale problem by iteratively refining sub problems that build up to a solution of the joint problem.

In some embodiments. RL process 10 may use a slightly adjusted framework of reinforcement learning called the options framework. An option is a collection of primitive actions, they can also be thought of as a micro-policy that represents some more complicated action. For example, if the goal is to schedule a connection to be routed on a specific layer, there are several primitive actions that need to happen on a design to move this connection. An option here would parameterize these primitive actions so the agent would simply have access to the "schedule connection on layer i" action. Instead of formulating the problem as an MDP, embodiments included herein may formulate the problem as a semi-Markov decision process (SMDP), where the time steps between state changes may vary depending on the length of the complex actions. The lowest agents in the hierarchy may operate in this options architecture to perform learning for their respective problem type. Giving the agent access to options may improve the learning rate of the agent because they will not have to relearn specific sequences of actions each time they act in the environment. It also provides a way for us to initially inject meta-heuristics of how to solve the problem by the choice of options provided to each agent.

Imitation learning is an approach to reinforcement learning that uses examples of solutions to the MDP and has the agent imitate those solutions or use them as a basis for generalization. The reason for this is that the general reinforcement learning problem and solution seek to solve problems in any domain. The issue is that by being such a general algorithm, it sacrifices the ability to inject knowledge that we have about the domain the agent is operating. Imitation learning provides a teacher and student-like way of injecting bias for the system. This bias can then be used to bootstrap exploration in such a large state and action space. This is a much more efficient way to initialize learning agents then having them start somewhere random in such a huge space of possible policies.

In some embodiments, a Closed Loop Optimization system in the context of PCB Design Automation may be viewed as a System of Agents ("SOAs") performing a sequence of actions to progressively achieve PCB Design closure of the PCB under consideration. Accordingly, important design flow steps such as Placement, Via-Strategy and Routing may fall under the domain of each hierarchical agent. The closed feedback loop may be configured to solve problems over long time horizons and in a joint manner. The main issues faced by a learning agent in this domain are credit assignment and temporal abstraction. Embodiments of the present disclosure may solve these issues by using a domain knowledge inspired hierarchical agent to break up the optimization into two levels of sub-optimization problems. The lowest level of the agent hierarchy trains an agent on each of the design flow steps, for example, Place, Via, and Route. These agents learn to excel at their specific tasks under a specific state representation. The top level of the hierarchy may then be trained on these lower level "experts" to learn which one to dispatch given the state of the board it receives.

In some embodiments, the system of agents may correspond with the RL system that was described above, with a particular MDP described by our own specific representations. In some embodiments, the state representation may include a combination of one or more datatypes, some of which may include, but are not limited to, scalars, images, and graphs. Accordingly, embodiments of RL process 10 may utilize board images, scalars containing pertinent information such as wire length and board dimensions, and graphs of connectivity in order to provide the agent the most complete picture of the current state of the design.

In some embodiments, the action space may be comprised of the primitive (or incremental) actions and complex options/actions. Some examples of the incremental actions performed by the system of agents may include, but are not limited to, via insertion, layer changes, via sharing, component movement, via movement, etc. The complex actions listed above may have variations such as Genetic or Analytical Placement, hyperparameter specifications for complex algorithms (such as number of generations, number of routing passes, etc.), Via-Strategy styles (e.g. Random vs. H-V seed, insert layer flow vias, etc.). The primary component of the reward for completing an action may include the routability of the design state. In the example of placement and via-strategy complex and primitive actions, this routability may be the inferred routability from the respective machine learning model that has been trained using the corresponding classes of states such as placed or Via/layer assigned states.

In some embodiments, once properly trained, RL process 10 may be configured to solve the long time horizon issue by breaking up time based off which agent is dispatched. The credit assignment problem may also be solved due to the reward structure of the problem. Each low-level agent may receive dense feedback from a CNN that evaluates the expected routability of the board after each action taken by the agent. Accordingly, the agent may very quickly learn the effect of its actions on value. The high-level agent may also receive a reward based on routability of the board after its sub-agent has finished acting. In order to combat conflicting goals between two agents (the joint optimization issue), RL process 10 may use a single, shared representation between all agents so that actions taken by one agent may allow the reward function to take into account whether the action may affect routability by another low level agent. Overall, this system will be able to learn at a very high level of abstraction what needs to be done on a board to push it towards design closure.

In some embodiments, the definition of a state of a PCB design would be a representation that uniquely captures the PCB design state after a specific action (complex or primitive) has been performed. The ideal format of the design state may then be the entire design database after the action has been performed. Unfortunately, using the database to represent a state in reinforcement learning may not work for a variety of reasons. Since the state space is huge, the reward and environment mechanism will ultimately have to be encapsulated in a trained deep-learning (DL) model. Hence, a state representation will have to obey the requirements of feature vector representations. Further, on disk and in memory storage of each design snapshot DBs will become intractable regarding lookup compute time and storage space.

In some embodiments, RL process 10 may be configured to generate a feature-vector based encoding of the design which may uniquely capture the spatial as well as connectivity features of the design. This may be achieved using a number of techniques, which are discussed in further detail below. Some techniques may include, but are not limited to, using image representations of different views of the design (e.g., Rectangular Uniform wire DensitY ("RUDY"), Design image including flight-line connections), using scalar values (such as board dimensions, number of discrete components, number of fixed components, number of signal and power nets, total wire length, etc.), and/or encoding of the connectivity graph using new model architectures such as Graph Convolutional Networks (GCN's).

In some embodiments, RL process 10 may utilize one or more additional and novel encoding mechanisms to uniquely correlate the above feature vectors. Some of these may include, but are not limited to, using device identifiers for pixel values within images and the same identifiers for nodes in the GCNs, etc.

In some embodiments, the granularity of the actions a system of agents chooses to perform may change depending on the policy or its upper level agent. For example, fine-grained actions, or primitive actions, may be those that are applied to individual objects in a design. For instance, changing the layer of a connection, moving the position of a component, and adding a new via in a connection. These primitive actions may incrementally improve the design without having to make significant changes and is thus faster to perform and evaluate. Alternatively, complex actions usually result in more fundamental changes to the design. For example, a complex action may be a collection of ordered primitive actions or an analytical/genetic optimization process. They may significantly change the whole design in one or more aspects such as placement, via strategy and routing. A complex action may help the system of agents avoid local optima and more radically explore the problem space at the cost of requiring more time to perform and evaluate the action. Therefore, having both primitive and complex actions gives the system of agents more degrees of freedom, and they complement each other in terms of optimization performance and runtime performance.

In some embodiments, a reward function may serve as the system designer's way of communicating the type of behavior that may be desired from a reinforcement learning agent. Often, in reinforcement learning, immediate rewards from actions may not be a good indication of the best path to achieving a goal. A policy may be greedy and choose to take actions that may yield the highest immediate rewards, however, in so doing, bypass states which may have yielded even higher rewards along the way. Accordingly, a reinforcement learning agent may learn by spending a certain percentage of its time in exploring actions which may not yield the highest immediate rewards but may uncover states along the way which yield higher rewards. Rewards for actions may be computed in various ways. There may be certain primitive actions such as moving or inserting a single via for which it may be impossible to compute the consequence to the overall design, hence for these primitive actions RL process 10 may assign an unbiased reward value of 0. There may be primitive actions which may cause design rule violations or other illegal consequences, hence RL process 10 may assign an aggressive penalty of a large negative number (or even-infinity) to avoid these actions. Complex actions such as running a trial of genetic optimization with specific parameters may yield a positive reward value which may be proportional to the fitness value of the complex action such as a routability metric discussed herein. As discussed above, RL process 10 may also combine rewards from different metrics to give an overall reward to the agent. There may be reward functions (or neural networks) that approximate how well a design is performing through its signal and power integrity (SI/PI) or its thermal capabilities. All of these can be added together in certain ratios to specify to our agent specific behaviors that we want the system to have, all without having to rewrite any code.

Figure 9:
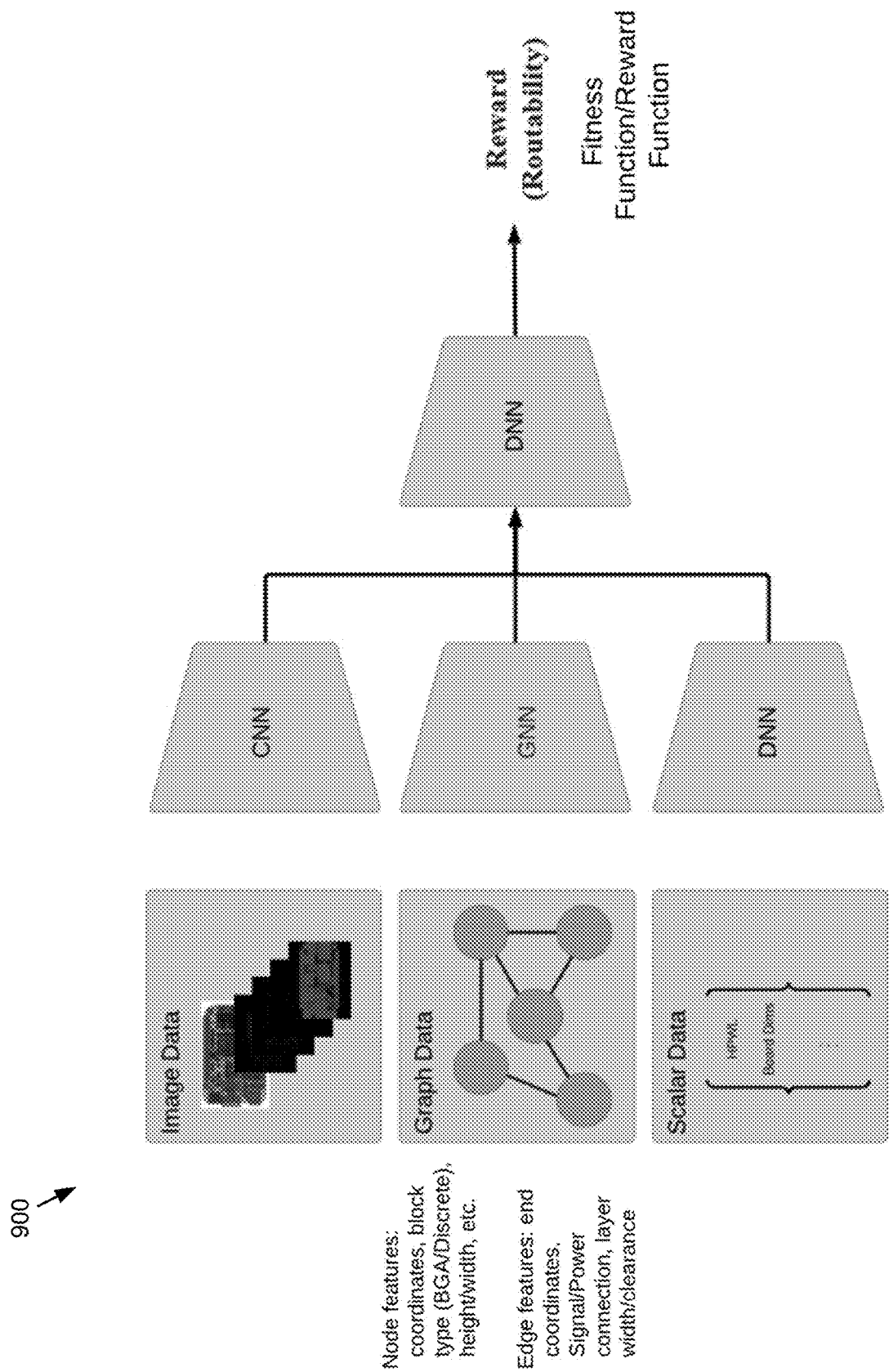
FIG. 9 is a flowchart depicting image-based state information and how different data may be incorporated to train a deep neural network in accordance with an embodiment of the present disclosure.

In some embodiments, and referring also to FIG. 9, RL process 10 may receive a recommended action, for example, the first action or second action discussed herein. It should be noted that these actions may or may not be accepted. In some embodiments, if the recommended action is accepted, RL process 10 may be configured to perform some or all of the updating, analyzing and other relevant operations discussed herein. Additionally and/or alternatively, RL process 10 may recommend an action that is not accepted. It should be noted that in this particular scenario the updated electronic design may or may not differ from the original electronic design. In other words, the original electronic design and the updated electronic design may be the same or different designs.

In one or more embodiments of the present disclosure a computer-implemented method for floorplanning using machine learning techniques is provided. The method may include receiving the requirements for an electronic design and then analyzing these requirements using a reinforcement learning agent. The method may further include recommending a sequence of actions from the domains of placement, via assignment and routing until an electronic design meeting the original requirements has been realized. The method may further include analyzing the updated electronic design using a system of reinforcement learning agents within but not limited to the domains of placement, via assignment and routing receiving feedback from these domain environments to keep updating the electronic design until the original requirements are realized.

The reinforcement learning agent may be a hierarchical reinforcement learning agent configured to construct a hierarchy of policies or agents to decompose a design task associated with the electronic design. Analyzing the sequence of electronic design states along the way to fully realizing a design that meets all requirements may including analyzing design state which may include images, graphs or scalar feature values. Analyzing may include analyzing at least one of a primitive action or a complex action. The method may further include applying a neural network to approximate board routability for use as a fitness function or a reward function. The method may also include receiving a completed design and analyzing the completed design using the reinforcement learning agent. The method may further include applying a reward function to the reinforcement learning agent.

Embodiments of RL process 10 may provide numerous advantages over existing approaches. RL process 10 provides a feedback-based design automation that may be configured to iteratively refine a design for as long as it takes to reach closure (e.g., it will not return an invalid board). RL process 10 may utilize a hierarchical decomposition of a design problem for reinforcement learning and the state space may be uniquely represented in order to capture multi-modal information (e.g., scalar, image, and graph) for EDA applications. In some embodiments, RL process 10 may utilize one or more abstract actions (options) that may be domain specific to EDA to simplify learning for agent. RL process 10 may also be configured to utilize neural networks to approximate board routability for use as a fitness function and reward function. The system may use one or more completed designs as examples for a design agent to imitate (e.g., imitation learning for design). RL process 10 may also be configured to use a mixture of reward functions in order to modulate the design synthesis process without specifying specific rules or writing new code.

In order to train a neural network to accurately predict the routability of a placed PCB design, PCB placements may be generated from a wide distribution of routability scores. This data may also come from many different PCB designs, since the ultimate goal is for the network to be able to take in a placement of a novel PCB design unseen during training and accurately predict its routability.

Each data point will consist of a feature, which will be some representation of a placed design, and a label, which will be the true routability of this placed design. To generate each placed design, an automated placer may be utilized. In some embodiments the automated placed may be a traditional automated placer which uses genetic optimization with a wire-crossings based fitness function. In order to ensure a wide distribution of routability scores, the fitness function and the placement technique used may be tweaked throughout data generation. A data augmenter is also disclosed that takes a placed design generated by an auto-placer and performs a sequence of random translations, rotations and swaps. The data augmenter helps to explore a wider variety of placements than just those generated by our auto-placer. To assign routability scores to these placements, a state-of-the-art autorouter may be utilized and the resulting completion rate recorded. The data generation process will be computationally demanding. In some embodiments cloud compute resources may be leveraged to run many jobs in parallel.

Figure 6:
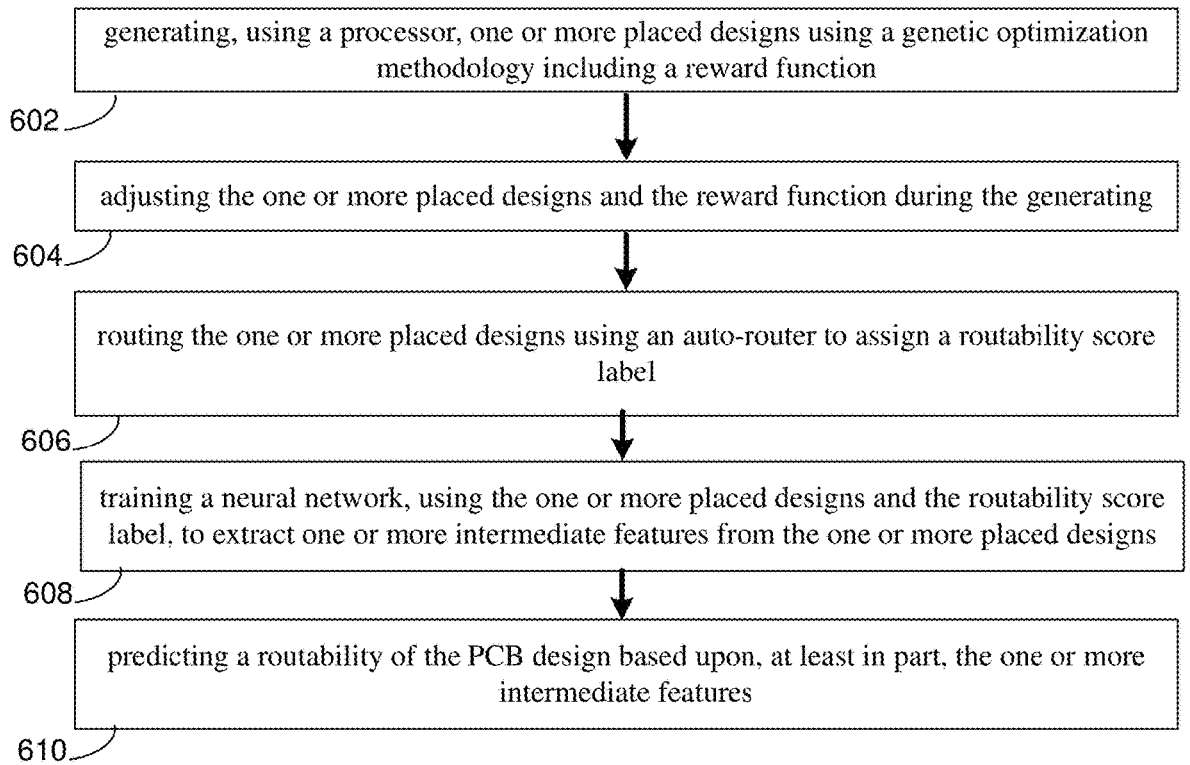
FIG. 6 is a flowchart depicting operations consistent with an embodiment of the PCB process in accordance with an embodiment of the present disclosure.

Referring now to FIG. 6, a flowchart depicting operations consistent with an embodiment of PCB process 11 is provided. PCB process 11 may include any or all of the features and subject matter discussed above with regard to RL process 10. Embodiments of PCB process 11 may include generating (602), using a processor, one or more placed designs using a genetic optimization methodology including a reward function and adjusting (604) the one or more placed designs and the reward function during the generating. Embodiments may further include routing (606) the one or more placed designs using an auto-router to assign a routability score label and training (608) a neural network, using the one or more placed designs and the routability score label, to extract one or more intermediate features from the one or more placed designs. Embodiments may also include predicting (610) a routability of the PCB design based upon, at least in part, the one or more intermediate features.

Referring now to FIGS. 7-11, embodiments of PCB process 11 may be configured to use a neural network to serve as a reward function for optimization-based approaches to PCB design automation. The system may utilize a neural network that inputs a representation of a placed PCB and outputs a routability score. In some embodiments, the neural network may be a deep neural network. Instead of using the traditional heuristic methods, the routability score from the trained neural network may be more accurate and may closer match the true reward. PCB process 11 may be focused on PCB component and via placement automation. PCB process 11 may be suitable for other potential applications in PCB design automation.

Optimization-based approaches like genetic optimization and reinforcement learning rely on a reward function to guide the optimization process. Thus, it is very important that the reward function closely approximates the true reward. In this context, the reward function assigns a score to a design, and actions may be taken to modify the design such that the assigned reward increases. By replacing previously used reward functions based on heuristics like congestion and wire-length with this neural network, the accuracy of the reward approximation may be increased. A more accurate reward function will improve the effectiveness of optimization-based approaches to PCB design automation The true reward assigned to a placed design is mostly captured by its routability (the percent of connections that are successfully routed), assuming that no design constraints are violated. This true routability may be found by running a state-of-the-art autorouter. Embodiments of the present disclosure may utilize any suitable autorouter such as those available from the assignee of the present disclosure. However, calculating the true reward is time consuming, and optimization-based approaches, like genetic optimization and reinforcement learning, often require the reward function to be called very frequently and thus must have low latency. However, it is also important for the reward function used to correlate with the true reward. Prior work on PCB placement automation has thus used reward functions based on heuristics, such as congestion and wire-length estimates, that attempt to approximate the true reward and can be calculated quickly.

For example, in some existing techniques the reward function used was a negative weighted sum of proxy wire length and congestion. However, using a reward function that only roughly correlates with the true reward will limit the potential of the learning algorithm. Heuristics like congestion and wire length only roughly correlate with routability because they do not fully capture what makes a placed design "routable." Accordingly, PCB process 11 may leverage and more intelligently synthesize latent information in a placed design in order to output rewards that correlate more strongly with the true routability of a placed design.

Instead of using these traditional heuristics, PCB process 11 may train a neural network or a deep neural network that takes as input a representation of a placed board and outputs a routability score. With the right training data and feature representation, this neural network will learn to distinguish aspects of a placed design that lead to a high routability. These latent properties of the placed design may be more nuanced than the heuristics, and by leveraging these latent properties the neural network outputs may create a better match to the true reward.

In some embodiments, PCB process 11 may utilize an iterative improvement approach for placement algorithms. Iterative improvement algorithms may be simpler and more effective than constructive placement algorithms because iterative improvement algorithms require less information about the design space. Constructive algorithms typically require significant data and information about the structure of the design space in order to generate high quality valid placements. In other words, PCB process 11 may see performance gains utilizing a valid placement and improving on it as much as possible.

The most commonly used heuristic to approximate routability is wire length. Part of the intuition behind this heuristic is that when wire length is minimized, the board components will be placed in such a way where pins on the same nets are near each other and are then easier to route. It has also been demonstrated in the chip placement domain that an additional benefit is that wire length tends to also correlate with other metrics of interest such as power and timing. The most popular estimate for a placement's wire length is to use the half-perimeter wire length ("HPWL"). The HPWL for a net is the half-perimeter of the smallest bounding box enclosing each node in the net. The HPWL for a placement is then calculated by averaging those of each net, weighting each contribution by number of nodes. One problem with this heuristic is that when a board has a large amount of whitespace, optimizing for wire length can lead to placements where components do not take advantage of the available board space. Modern PCB's often have significant whitespace, as it has become commonplace to add extra middle signal layers to route connections from other layers. Another drawback is that the HPWL value, along with other common wire-length estimates, are of course only approximations of the actual wire-length.

Crossings is another commonly used proxy for routability. There are many ways to calculate the crossings of a placed board. One way is to start by drawing connections between all possible node pairs for each net, and then count the total number of connections that intersect. Another approach would be to only draw connections that are part of the Minimum Spanning Tree (MST) of a net. Crossings also clearly do not fully capture the routability of a board placement. One issue is that crossings are generated based on the connections given by the netlist, and have thus not yet been assigned to a layer. On PCBs with many layers the crossings map calculated at the placement stage will often change significantly once vias are placed and layers are assigned. Another issue with the crossings heuristic is that the connections may be drawn without considering real-world routing constraints like wire widths and clearances. If connections are parallel but closely spaced, for example, this will not be counted as a crossing but will be invalid at routing time.

There are many other routability heuristics that have been developed to try and address the shortcomings of wire length and crossings estimates. One of these is RUDY, which factors not just HPWL but also in average wire-to-wire pitch, the number of routing layers and net area. Others combine heuristics into a weighted average. However, these routability proxies still rely on core heuristics that are inadequate regarding their correlation with true routability.

Figure 7:
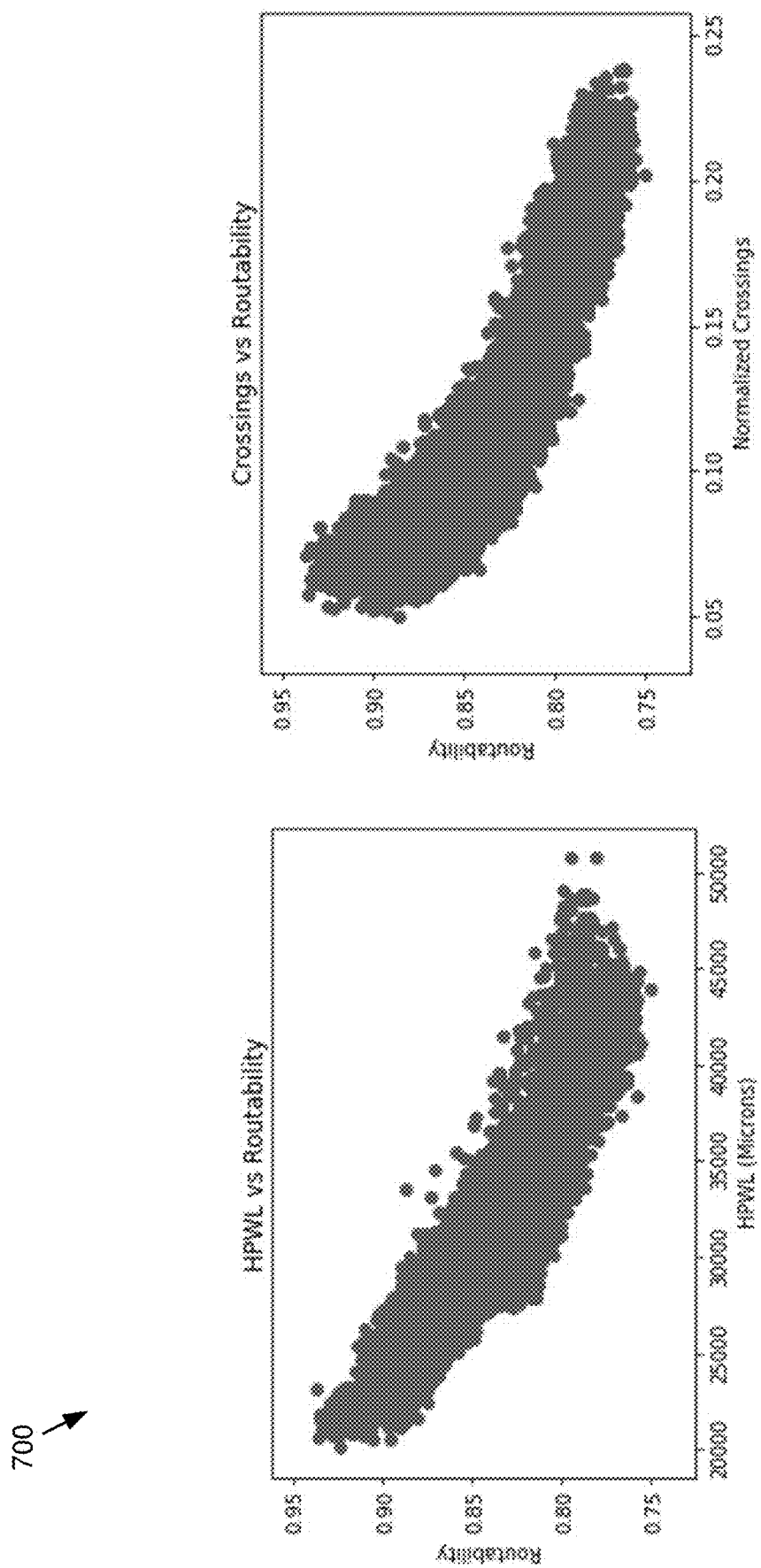
FIG. 7 are plots depicting how both HPWL and crossings values of PCB component placements correlate with routability.

Referring now to FIG. 7, the two plots and the following table show how both HPWL and crossings values of PCB component placements correlate with routability. Conventional PCB design automation flow is used to generate the data for these plots. This flow begins with a genetic optimization ("GO") based component placement, followed by GO based via placement and then finally the design may be routed using state-of-the-art PCB autorouter. Using a medium-sized PCB design with around 350 components, 12,000 unique component placements were generated, then viaed, routed, and recorded the resulting routability score. For each of the 12,000 unique component placements, the HPWL and the normalized number of crossings was recorded. The HPWL was calculated as described above and the normalized number of crossings was calculated by fully connecting pins in each net and then counting intersections. The crossings were normalized by dividing by the max number of potential crossings. The left plot shows HPWL vs the routability score, and the right plot shows the normalized crossings value vs routability score. The correlation coefficients for proxy heuristics vs true routability are shown in the below table.

TABLE 1

| | Correlation Coefficient |
|---|---|
| HPWL vs Routability | −0.923 |
| Normalized Crossings vs Routability | −0.898 |

From this data it should be noted, that although both HPWL and crossings metrics have a strong negative correlation with routability, the plots show that the range of potential routabilities given a heuristic value is quite large. For example, when the normalized crossings value is around 0.075, the routability ranges from around 0.83-0.94. Thus, if we were to use normalized crossings in our fitness function for a GO based component placement algorithm, even if the entire population of placements had a low number of crossings, the final placement could still have a routability that is significantly lower than what was available.

For a via placement algorithm that is GO based, the resulting routability assigned to each component placed design is non-deterministic. As an example, to quantify the stochasticity of the via placement and routing stage, three of the placed designs were routed each 100 times, and the routabilities of each were recorded. The below table shows the routability mean and standard deviations for each of these designs after labelling the three placed designs 100 times each.

TABLE 2

| | Mean Routability | Standard Deviation |
|---|---|---|
| Placed Design 1 | 0.8437 | 0.0056 |
| Placed Design 2 | 0.8592 | 0.0048 |
| Placed Design 3 | 0.8382 | 0.0059 |

It can be seen that the standard deviation is ~0.005 for each, which is clearly not enough to account for the large routability ranges given fixed heuristic values shown in the above plots. Thus it can be concluded that using HPWL or normalized crossings in the fitness function would lead to sub-optimal PCB component placement when optimizing for routability.

Figure 8:
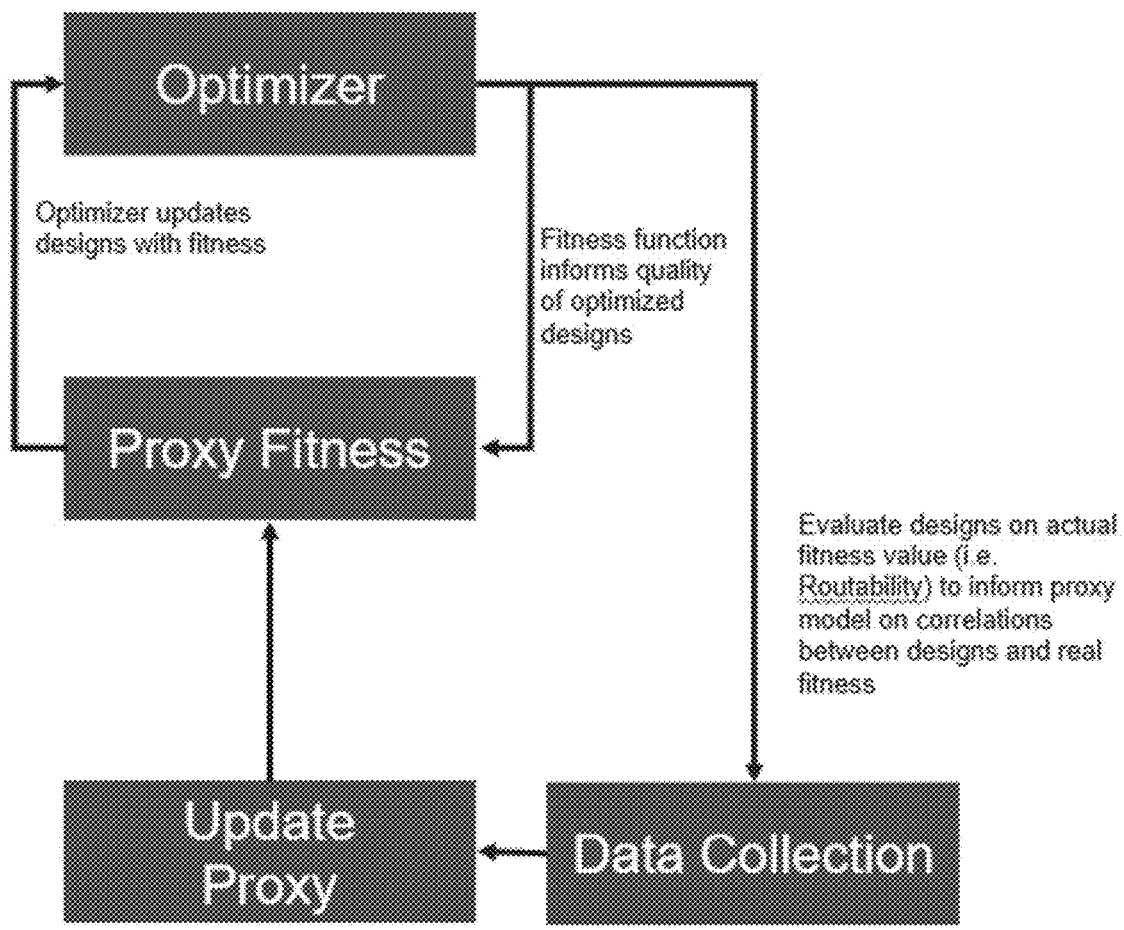
FIG. 8 is a flowchart depicting a high level overview of how a neural network fitness function is utilized in the PCB design automation flow in accordance with an embodiment of the present disclosure.

Referring now to FIG. 8, flowchart 800 depicts a high level overview of how a neural network fitness function may be utilized in a PCB design automation flow (e.g. PCB process 11) in accordance with an embodiment of the present disclosure. As mentioned, the proxy value may be used to compute heuristics for the true fitness, which is the completion rate that results from running the auto-router on a placed design. This proxy begins as one of the routability heuristics such as crossings or wirelength. The proxy value may be used to guide the optimization process, and it outputs one or more placed PCB designs. This optimization process may use an iterative improvement approach, meaning that it may begin with a placed design and gradually modify it to either maximize or minimize the proxy fitness. In the data collection process, embodiments of PCB process 10 may be configured to run the optimizer and save every resulting design. This may include designs generated early in the optimization process, not just the final result, since we want a placed design with a wide variety of routability scores.

In some embodiments, PCB process 11 may run the optimization process many times and generate a large dataset of placements. PCB process 10 may then route each of these designs using the auto-router to obtain the true routability score for each design. Accordingly, each data point in the dataset may consist of a placed design and its true routability score. This dataset may be used to train a neural network that can predict the routability of a novel placed design. This neural network may then be used as the new proxy fitness function, and ideally improves the performance of the optimizer.

The success of any iterative improvement placement algorithm is highly dependent on how accurately its fitness function matches the true routability of the placed design. As explained above, each of the aforementioned heuristics fails to fully capture what makes a placement routable. Instead of using these traditional heuristics, PCB process 11 may train a neural network and/or a deep neural network that takes as input a representation of a placed PCB and outputs a routability score. With enough training data and the right placement feature representation and network architecture, this network may learn to distinguish which aspects of a placed PCB design lead to a high routability. These latent properties of a placed design may be more nuanced than the aforementioned heuristics, and by leveraging them the network outputs should more closely match the true routability of a placement.

Referring again to FIG. 9, flowchart 900 depicts image-based state information and depicts how different data may be incorporated to train a deep neural network in accordance with an embodiment of the present disclosure. On the left are various representations of a placed design, including image-based, graphical, and scalar representations. In this particular example, placed designs may be represented as image data, graph data, and/or scalar data.

In some embodiments, each placed design representation may have a corresponding neural network architecture that may learn to extract relevant parts of the input to generate an intermediate feature. For example, image data may have a corresponding neural network architecture as a convolutional neural network (CNN) model. Graph data may have a corresponding neural network architecture as a graph convolutional network (GCN) and the scalar data may have a corresponding neural network architecture as a deep neural network (DNN). Scalar Data may include, but is not limited to, HPWL and board dimensions. An additional network may take in the joint feature and uses it to predict routability (e.g., the percent of successfully routed connections) as the reward. The additional network may be a second DNN.

Figure 10:
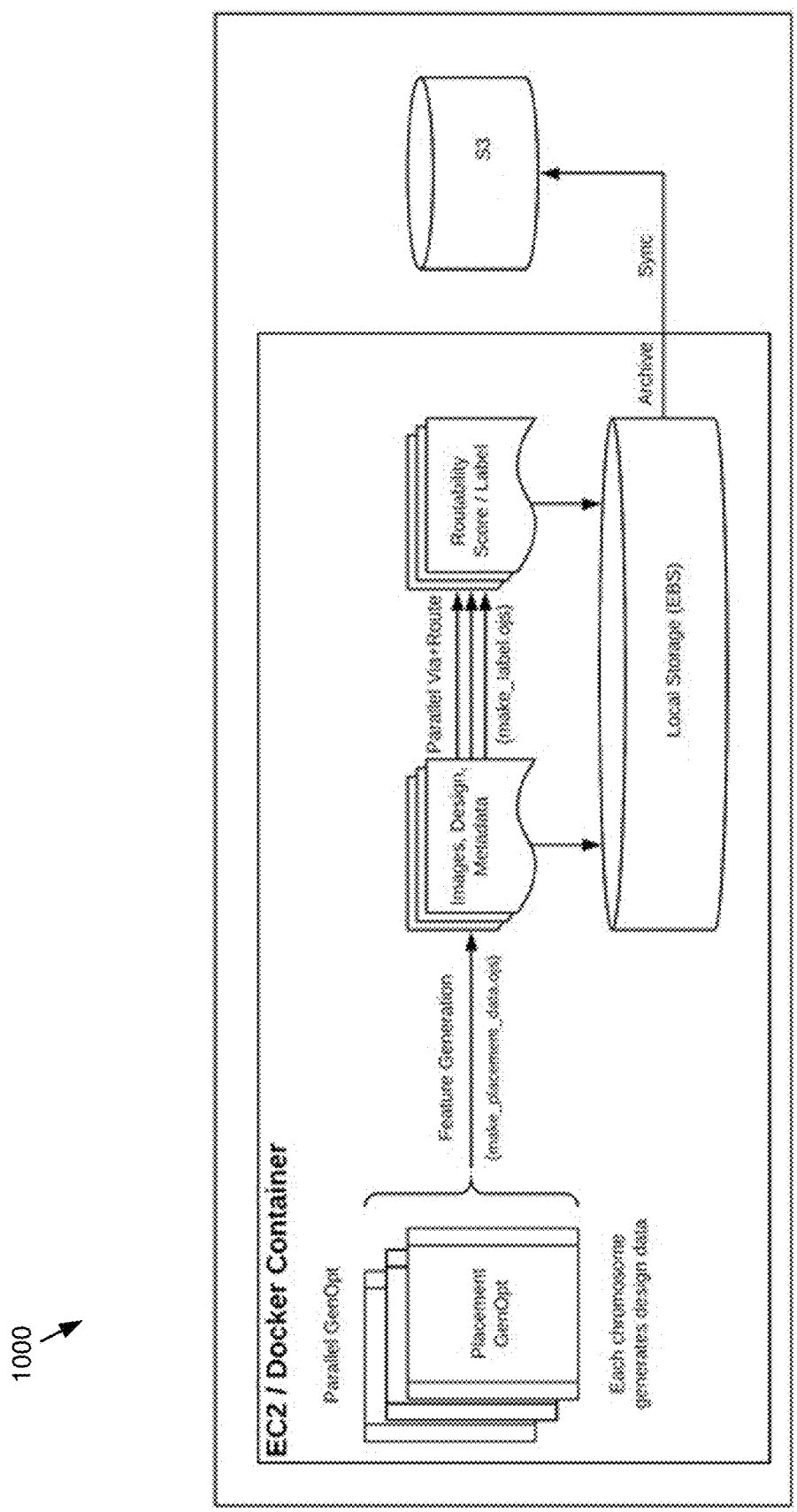
FIG. 10 is a diagram depicting a data generation process in accordance with an embodiment of the present disclosure.

Referring now to FIG. 10, diagram 1000 depicts a data generation process. The data generation process may include running an auto-placer to create the placed designs, followed by running a via placement engine, and then an autorouter to attain routability scores for each placement. Diagram 1000 also depicts an embodiment utilizing cloud resources to facilitate this process. Cloud resources may be on-demand, network accessible computing resources, using any suitable cloud based resource.

In some embodiments, PCB process 11 may be configured to run an auto-placer to create the placed designs. This process may include the use of a genetic optimization algorithm. In some embodiments, the auto-placer may be configured to run genetic optimization for the placements in parallel. Each chromosome may generate design data, where a chromosome may be a representation of a placed PCB design.

In some embodiments, feature generation may refer to the process of starting with raw data and processing it in a manner that makes it more useful when input to a machine learning model. This may include, but is not limited to, removing information that is irrelevant or redundant, converting non-numerical information to a numerical representation, etc. Accordingly, in FIG. 10, "Make_placement_data.ojs" is the name of the file used to execute the data generation process. "Parallel Via+Route" refers to two different stages of the PCB design automation flow. The via stage may assign netlist connections to layers, and PCB process 11 may utilize a GO based algorithm for this. The routing stage may involve running the autorouter to route the design. Regarding how this fits into the broader placement data-generation process, each data point in our datasets may consist of a feature, which is the placed design, and a label, which is the true routability score. The label may be generated by first running the GO via assignment process followed by the autorouter, and thus these two stages together form a "labelling" process. As such, the flow may be separated into two phases, one where placements are generated, and another where they are labelled. Once PCB process 11 has generated many different placements, the process may then run the labelling process on many of them in parallel. In this example, "Make_label.ojs" is the name of the file used to execute this labelling process.

In some embodiments, the results of images, design, and metadata may be stored in computer readable signal medium, such as, but not limited to, local storage, and the results of images, design, metadata may be viaed and routed at Parallel Via+Route. In some embodiments, Parallel Via+Route may be done in parallel. Once the placed designs have been viaed and routed the placed design may be labelled with the routability score. The results may be stored in computer readable signal medium and may associated with the output from images, design, metadata. Local storage may be archived from a virtual environment and may be synced with computer readable signal medium outside the virtual environment.

In some embodiments, the approach of training a model to predict true routability depicted in diagram 1000 may also be applied other phases of the PCB design flow encompassed in PCB process 11. The above strategy may be applied to via strategy which is another component of the PCB design flow. Given a good placement optimized for routability using embodiments of model-based approaches, as described above, the next step in the PCB design flow may be to assign routing layers to the various signal connections such that the original goal of maximizing routability can continue to be maintained. Some PCB autorouters may jointly assign routing layers and route, however some embodiments of the design flow in PCB process 11 separate the two phases by assigning all layers and then routing. Each routing layer may be processed independent of other layers. So given a fixed number of available signal routing layers (for example, N layers) the objective is to assign these N layers across all the signal connections such that the routability within each layer may be maximized. Iterative algorithms such as GO use proxies such as minimizing the number of crossings within each routing layer assignment to approximate maximizing routability. Here, PCB process 11 may train a neural network after collecting data samples for each layer assignment and then actually routing each of the assigned layers so that PCB process 11 may label this data sample for a specific individual layer assignment (along with all the corresponding placed components, pins and vias on this specific layer) with the routability score. During the actual operation of the iterative algorithm, the fitness function of approximate proxies (such as crossings) may be replaced by the true routability prediction for a specific layer. Each of the layer routability predictions may then be normalized and aggregated to obtain a true overall routability prediction for the entire board's via and layer assignment across all layers.

It is very important that the feature representation used to represent a PCB placement captures the information that is relevant to routability, while ideally also limiting the amount of irrelevant information included. Issues with previous approaches note that the representations that they choose tend to abstract or remove important information that may be necessary to PCB design. For example, abstractions tend to assume all pins are located at the center of a component (this approximation breaks down when there is a large variety of component aspect ratios) or they might assume that all layer shapes on a layer will be a standard size (most components have a variety of pin shapes and pitches).

Now referring to FIG. 11, an example 3-channel image-based representation for a placed design is provided. Each channel's image represents different board layers, specifically a top, a middle, and a bottom layer.

The neural networks may provide an effective way to learn rich features from raw data collected. Various representations of placed designs may be used and in each case use a neural network architecture suited to the feature type (see also, FIG. 9). FIG. 11 depicts an example representation as image-based, where an image of each layer of the placed PCB is superimposed with the netlist connections that belong to devices on each layer. In some embodiments, a convolutional neural network (CNN) model may also be trained on this data.

In other embodiments, graphical representations of a PCB placement may be used to train a corresponding graph convolutional network (GCN). Graphs may be a preferable embodiment of representation the data in our system, because the internal representation for the system is a relational database. A GCN may be able to distill more useful features that can be more directly inferred than from an altered representation like an image. Scalar features may be included as they can add important information and metadata about the design that cannot be contained in the standardized representations of images and graphs.

In some embodiments, once the model is trained, the evaluation may be divided into three main phases. First, single board generalization may test whether the model can generalize to instances of a trained design that have different data points than seen in the training phase. Second, multi-board generalization may test that a model trained on multiple designs can generalize to new examples within that dataset of designs. The third, and most important, evaluation is whether the model can generalize to new board instances it has not seen before. If the model learns sufficiently useful features to predict routability, then it may generalize to new designs and will provide a robust, useful metric to optimize for iterative optimization approaches.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:
1. A computer implemented method associated with a printed circuit board ("PCB") design, comprising:
  generating, using a processor, one or more placed PCB designs using a genetic optimization methodology including a reward function;

adjusting the one or more placed PCB designs and the reward function during the generating;

routing the one or more placed PCB designs using an auto-router to assign a routability score label;

training a neural network architecture, using the one or more placed PCB designs and the routability score label, to extract one or more intermediate features from the one or more placed PCB designs, wherein the neural network architecture includes:

a convolutional neural network ("CNN") that processes image data representations of the one or more PCB designs, a graph convolutional network ("GCN") that processes graph data representations of the one or more PCB designs, a first deep neural network ("DNN") that processes scalar data representations of the one or more PCB designs, and a second DNN that extracts the one or more intermediate features from outputs of the CNN, the GCN, and the first DNN; and predicting a routability of the PCB design using the second DNN based upon, at least in part, the one or more intermediate features, wherein routability relates to a percentage of successfully routed connections between components of the PCB design.

2. The computer implemented method of claim 1, wherein the reward function is a wire-crossings based reward function.

3. The computer implemented method of claim 1, wherein the one or more placed PCB designs includes image data.

4. The computer implemented method of claim 1, wherein the one or more placed PCB designs includes graph data.

5. The computer implemented method of claim 1, wherein the one or more placed PCB designs includes scalar data.

6. A non-transitory computer readable medium having stored thereon instructions, which when executed by a processor result in one or more operations, the operations comprising:

generating, using a processor, one or more placed PCB designs using a genetic optimization methodology including a reward function;

adjusting the one or more placed PCB designs and the reward function during the generating;

routing the one or more placed PCB designs using an auto-router to assign a routability score label;

training a neural network architecture, using the one or more placed PCB designs and the routability score label, to extract one or more intermediate features from the one or more placed PCB designs, wherein the neural network architecture includes:

a convolutional neural network ("CNN") that processes image data representations of the one or more PCB designs, a graph convolutional network ("GCN") that processes graph data representations of the one or more PCB designs, a first deep neural network ("DNN") that processes scalar data representations of the one or more PCB designs, and a second DNN that extracts the one or more intermediate features from outputs of the CNN, the GCN, and the first DNN; and predicting a routability of the PCB design using the second DNN based upon, at least in part, the one or more intermediate features, wherein routability relates to a percentage of successfully routed connections of the PCB design.

7. The computer readable medium of claim 6, wherein the reward function is a wire-crossings based reward function.

8. The computer readable medium of claim 6, wherein the one or more placed PCB designs includes image data.

9. The computer readable medium of claim 6, wherein the one or more placed PCB designs includes graph data.

10. The computer readable medium of claim 6, wherein the one or more placed PCB designs includes scalar data.

11. A system associated with a printed circuit board ("PCB") design, comprising:

a processor configured to generate one or more placed PCB designs using a genetic optimization methodology including a reward function and to adjust the one or more placed PCB designs and the reward function during the generating, the processor further configured to route the one or more placed PCB designs using an auto-router to assign a routability score label, the processor further configured to train a neural network architecture, using the one or more placed PCB designs and the routability score label, to extract one or more intermediate features from the one or more placed PCB designs, wherein the neural network architecture includes: a convolutional neural network ("CNN") that processes image data representations of the one or more PCB designs, a graph convolutional network ("GCN") that processes graph data representations of the one or more PCB designs, a first deep neural network ("DNN") that processes scalar data representations of the one or more PCB designs, and a second DNN that extracts the one or more intermediate features from outputs of the CNN, the GCN, and the first DNN, the processor further configured to predict a routability of the PCB design using the second DNN based upon, at least in part, the one or more intermediate features, wherein routability relates to a percentage of successfully routed connections of the PCB design.

12. The system of claim 11 wherein the reward function is a wire-crossings based reward function.

\* \* \* \* \*